United States Patent [19]
Oda et al.

[11] Patent Number: 5,234,997
[45] Date of Patent: Aug. 10, 1993

[54] FIBER-REINFORCED CHLORINATED POLYETHYLENE COMPOSITION AND PROCESS FOR PRODUCTION THEREOF

[75] Inventors: Kunio Oda, Sakura; Denichi Oda; Yuichi Fujii, both of Ichihara; Takeshi Takagi, Hirakata, all of Japan

[73] Assignee: Ube Industries, Ltd., Yamaguchi, Japan

[21] Appl. No.: 496,401

[22] Filed: Mar. 20, 1990

[30] Foreign Application Priority Data

Mar. 24, 1989 [JP] Japan .................................. 1-70444

[51] Int. Cl.$^5$ .............................................. C08L 77/00
[52] U.S. Cl. ..................................... 525/184; 525/178
[58] Field of Search ................................ 525/133, 184

[56] References Cited

U.S. PATENT DOCUMENTS

| | | | |
|---|---|---|---|
| 4,207,404 | 6/1980 | Coran et al. | 525/184 |
| 4,602,063 | 7/1986 | Yamamoto et al. | 525/127 |
| 4,703,086 | 10/1987 | Yamamoto et al. | 525/133 |

FOREIGN PATENT DOCUMENTS 2125731  3/1984  United Kingdom .

Primary Examiner—Ana L. Carrillo
Attorney, Agent, or Firm—Nixon & Vanderhye

[57] ABSTRACT

A fiber-reinforced chlorinated polyethylene composition comprises 100 parts by weight of a continuous phase of a chlorinated polyethylene and 2-100 parts by weight of a polyamide dispersed in the continuous phase in a fine short fiber form. Further a process comprises kneading a chlorinated polyethylene and a fiber-formable polyamide at a temperature not lower than the melting point of the polyamide and then stretching the kneaded product to obtain the above fiber-reinforced chlorinated polyethylene composition. When in the above process, the kneading is effected by further adding a reactive binder, there can be obtained a fiber-reinforced chlorinated polyethylene composition wherein the compatibility and dispersion of the fiber-formable polyamide with and in the chlorinated polyethylene are improved. The fiber-reinforced chlorinated polyethylene composition is superior in mechanical properties, fatigue resistance and heat resistance and further has good processability, and can be suitably used in the wide field of chlorinated polyethylene applications.

3 Claims, No Drawings

FIBER-REINFORCED CHLORINATED POLYETHYLENE COMPOSITION AND PROCESS FOR PRODUCTION THEREOF

BACKGROUND OF THE INVENTION AND RELATED ART STATEMENT

The present invention relates to a novel fiber-reinforced chlorinated polyethylene composition and a process for producing said composition. More particularly, the present invention relates to a fiber-reinforced chlorinated polyethylene composition comprising a chlorinated polyethylene and a polyamide of fine short fiber form dispersed in the chlorinated polyethylene as a reinforcing agent, which is superior in mechanical properties, fatigue resistance, heat resistance and processability and which can be suitably used in various products requiring chlorinated polyethylene, as well as to a process for producing said composition.

Chlorinated polyethylenes vary from those which are noncrystalline or microcrystalline, have rubber elasticity and are soft, to those which are semicrystalline and hard plastic-like. In general, chlorinated polyethylenes have good characteristics in flexibility, weather resistance, oil resistance, chemical resistance, electrical properties, flame retardancy, self-extinguishing property, processability, and compatibility with other polymers, and are in wide use in various products as a base rubber, a base resin or a modifier for other polymers.

Examples of the application of chlorinated polyethylene include hoses, sheets, roofings, wire coatings, parts for automobiles, electrical parts, and impact resistance and/or flame retardancy improvers for polyvinyl chloride, polyethylene, polypropylene, polystyrene, ABS resin, etc. However, in using a chlorinated polyethylene in these applications, the mechanical properties (e.g. rigidity, strength) and heat resistance are insufficient in some cases; therefore, it has been desired to improve the mechanical properties and heat resistance of chlorinated polyethylene without sacrifying its processability.

In order to improve the mechanical properties of a resin or a rubber, it is most generally conducted to add thereto an inorganic filler or carbon black. This improvement usually requires a large amount of the additive and, in many cases, the improvement effect is still insufficient. Increase in addition amount for higher reinforcement effect results in reduced fluidity, dispersibility and processability, or in greatly reduced mechanical properties (e.g. strength, elongation, impact resistance). Thus, the addition of inorganic filler or carbon black has a restriction in addition amount or reinforcement effect.

For more effective reinforcement, there is a reinforcement using a fibrous reinforcing agent. There have been studied and proposed various fiber-reinforced compositions obtained by adding to a base resin or rubber an inorganic fiber of glass, ceramic or the like, or an organic fiber of cellulose, polyester, polyamide, liquid crystal polymer or the like. In these compositions, the addition of a relatively small amount of a fiber can increase rigidity; however, dispersibility and fluidity are reduced, and the molded articles produced from the compositions have surface roughening, reduced processability and, when undergoing a large deformation, insufficient fatigue resistance. These problems are attributed to the relatively large diameter (generally 0.01 mm or more) and rigidity of fiber, which is a detrimental drawback when it is intended to reinforce a resin or rubber having flexibility (e.g. chlorinated polyethylene) without sacrifying the flexibility. Further, since the fiber has a relatively large diameter, the fiber's total surface is small when the fiber is added in a given amount, and resultantly the compatibility between the fiber and the resin or rubber to be reinforced is insufficient. This is considered to be another reason for the above problems.

SUMMARY OF THE INVENTION

The object of the present invention is to respond to the above requirement, solve the problems of the prior art and provide (a) a fiber-reinforced chlorinated polyethylene composition superior in mechanical properties, fatigue resistance, heat resistance and processability and (b) a process for producing said composition.

In order to attain the above object, the present inventors made study, and found a novel fiber-reinforced chlorinated polyethylene composition using a polyamide of fine short fiber form as a reinforcing agent and a process for producing said composition. The finding has led to the completion of the present invention.

The present invention provides a fiber-reinforced chlorinated polyethylene composition comprising 100 parts by weight of a chlorinated polyethylene and 2-100 parts by weight of a polyamide of fine short fiber form dispersed in said chlorinated polyethylene. More effectively, the composition further comprises a reactive binder in an amount of 15 parts by weight or less per 100 parts by weight of the polyamide.

The present invention further provides a process for producing a fiber-reinforced chlorinated polyethylene composition, which comprises kneading 100 parts by weight of a chlorinated polyethylene and 2-100 parts by weight of a fiber-formable polyamide at a temperature not lower than the melting point of the polyamide to obtain a kneaded product comprising a continuous phase of the chlorinated polyethylene and a dispersed phase of the polyamide, and stretching the kneaded product under such conditions that the polyamide can undergo plastic deformation easily. More effectively, the process further comprises adding, at the time of kneading the chlorinated polyethylene and the polyamide, a reactive binder in an amount of 15 parts by weight or less per 100 parts by weight of the polyamide.

DETAILED DESCRIPTION OF THE INVENTION

The chlorinated polyethylene used in the present invention can be obtained by chlorinating a polyethylene according to an aqueous dispersion method or the like, has a chlorine content of 20–50% by weight, contains remaining polyethylene crystals in an amount of 25% by weight or less, and accordingly is a noncrystalline, microcrystalline or semicrystalline chlorinated polyethylene.

In the present invention, a polyamide of fine short fiber form is used as a reinforcing agent. It is because the polyamide has good compatibility with the chlorinated polyethylene and because the fine short fiber form of the polyamide has a rigidity (flexibility) and a strength both suited for the reinforcement of the chlorinated polyethylene having flexibility.

The polyamide used in the present invention is a fiber-formable thermoplastic nylon and is a polyamide (which may be a copolymer type polyamide) such as nylon 6, nylon 11, nylon 12, nylon 66, nylon 610, nylon 612, nylon 6,66 or their mixture. The polyamide has a molecular weight of preferably 8,000 or more and a melting point of preferably 150°–260° C.

In the fiber-reinforced chlorinated polyethylene composition of the present invention, the polyamide dispersed in the chlorinated polyethylene has a fine short fiber form. That is, the polyamide consists mostly of fine short fibers having a length of 0.05 mm or more and a maximum diameter of 0.005 mm or less in the cross-section orthogonal to the longer direction. The polyamide may contain a granular, bar-like or film-like portion in a small amount, but the presence of such a portion in a large amount must be avoided because it adversely affects reinforcemenet effect, dispersibility and fluidity and reduces processability, appearance of final product, strength and fatigue resistance.

The proportion of the polyamide dispersed in the chlorinated polyethylene is 2–100 parts by weight per 100 parts by weight of the chlorinated polyethylene. When the proportion is less than 2 parts by weight, improvement in mechanical properties is little seen. When the proportion is more than 100 parts by weight, increase in rigidity is obtained but there are invited large reduction in strength and elongation as well as reduction in kneadability.

The present invention also provides a fiber-reinforced chlorinated polyethylene composition further comprising a reactive binder in an amount of 15 parts by weight of less per 100 parts by weight of the polyamide. This reactive binder acts so as to increase the compatibility between the chlorinated polyethylene (continuous phase) and the fine short fiber polyamide (dispersed phase), at the interfaces of the two. The reactive binder also acts so as to increase the dispersibility of the polyamide in the chlorinated polyethylene. These actions are effective for the improvement of the mechanical properties, fatigue resistance, heat resistance and processability of the chlorinated polyethylene reinforced by the polyamide of fine short fiber form.

As the reactive binder used in the present invention, there can be mentioned, for example, reactive silane compounds having at least one of vinyl group, methacryloxy group, epoxy group, amino group, mercapto group and the like; reactive titanium compounds having at least one of vinyl group, acrylate group, amino group, long chain alkyl ester group and the like; phenol-formaldehyde precondensates such as novolac type phenol-formaldehyde precondensate, novolac type lactam-bisphenol F-formaldehyde precondensate, resol type alkyl phenol-formaldehyde precondensate and the like; and $\alpha$, $\beta$-unsaturated carboxylic acids, alicyclic unsaturated carboxylic acids, alkenyl carboxylic acids and their derivatives. When there is used a phenol-formaldehyde resin precondensate, there must be used, in combination, an appropriate amount of a compound capable of generating formaldehyde when heated, such as hexamethylenetetramine, paraformaldehyde, $\alpha$-polyoxymethylene, acetoaldehyde ammonia or the like.

The fiber-reinforced chlorinated polyethylene composition of the present invention may further comprise various additives ordinarily used in chlorinated polyethylene compositions, such as stabilizer, acid acceptor, antioxidant, plasticizer, filler, processing aid, coloring agent and the like, in appropriate amounts.

The fiber-reinforced chlorinated polyethylene composition of the present invention can be produced, for example, by the process of the present invention mentioned below.

The process further provided in the present invention, for producing a fiber reinforced chlorinated polyethylene composition, comprises kneading 100 parts by weight of a chlorinated polyethylene and 2–100 parts by weight of a fiber-formable polyamide at a temperature not lower than the melting point of the polyamide to obtain a kneaded product comprising a continuous phase of the chlorinated polyethylene and a dispersed phase of the polyamide, and stretching the kneaded product under such conditions that the polyamide can undergo plastic deformation easily, or more effectively by, at the time of kneading the chlorinated polyethylene and the polyamide, adding a reactive binder in an amount of 15 parts by weight or less per 100 parts by weight of the polyamide.

The kneading of the chlorinated polyethylene and the polyamide, or of the chlorinated polyethylene, the polyamide and the reactive binder is effected for preferably 1–15 minutes at a temperature not lower than the melting point of the polyamide used, using an ordinary melt kneading device for rubbers and plastics, such as Brabender Plastograph, Banbury mixer, cokneader, single-screw or twin-screw extruder or the like. When the kneading is effected at a temperature lower than the melting point of the polyamide, the fine dispersion of the polyamide in the chlorinated polyethylene is impossible and no fiber-reinforced chlorinated polyethylene composition as intended can be obtained.

The stretching effected after the kneading is necessary for converting the polyamide dispersed in the chlorinated polyethylene, into a fine short fiber form as desired. The stretching can be effected by a carendering method with rolls, a method of taking off, under drafting, an extrudate provided by an extruder, or a method of stretching an extrudate under heating and tension. The stretching force to be applied to the polyamide differs by the stretching method. No matter what stretching method is adopted, the stretching is effected under such conditions that the polyamide used undergoes plastic deformation easily. As an example, the extrudate in molten state provided by an extruder may be taken off under drafting corresponding to the appropriate stretch ratio, for example at a take-off speed of 1–50 m/min, in the atmosphere of room temperature. The stretch ratio can be 1.1 or more usually.

In order for the chlorinated polyethylene not to cause thermal deterioration or aging during the kneading and stretching and further in order to effect the stretching of the kneaded product with no problem, it is possible to add to the chlorinated polyethylene, as necessary, additives such as stabilizer, acid acceptor, antioxidant, lubricant, plasticizer and the like.

The amount of the reactive binder used is 15 parts by weight or less, preferably 7.5 parts by weight or less per 100 parts by weight of the polyamide. When the amount of the reactive binder is more than the above upper limit, there occurs gelation of the chlorinated polyethylene or the polyamide, making insufficient the dispersion and form of the polyamide reinforcing agent. The addition of the reactive binder can be effected by mixing with the chlorinated polyethylene or the polyamide in advance or by adding to the kneading system.

According to the process of the present invention, there can be obtained a fiber-reinforced chlorinated polyethylene composition wherein a polyamide consisting mainly of fine short fibers having a length of 0.05 mm or more and a maximum diameter of 0.005 mm or less in the cross-section orthogonal to the longer direction is finely dispersed in a chlorinated polyethylene which is a continuous phase.

The fiber-reinforced chlorinated polyethylene composition of the present invention is used as it is, or by as necessary adding a supplemental chlorinated polyethylene to control the proportion of the polyamide reinforcing agent. The composition is used after effecting cross-linking as necessary. The composition can be used for making various products such as hoses, sheets, roofings, wire coatings, parts for automobiles and electrical parts, and can be used as a modifying agent of polyvinyl chloride, polyethylene, polypropylene, polystyrene, ABS resin, etc., wherein a chlorinated polyethylene is ordinarily used. The composition of the present invention is used particularly in products requiring a chlorinated polyethylene superior in mechanical properties, fatigue resistance, heat resistance and processability.

EXAMPLES

The fiber-reinforced chlorinated polyethylene composition and the process for producing said composition, both according to the present invention are described specifically below by way of Examples and Comparative Examples. In the followings, parts are by weight, in all cases.

The details (manufacturer, properties, etc.) of part of the materials used in the followings are shown in Table 1.

dard, by visual observation and touching. Further, the form of polyamide was observed on the polyamide component obtained by toluene extraction, using a scanning type electron microscope and evaluated according to the following four-level rating standard. The results are shown in Table 2.

Rating standard for dispersibility of polyamide

⊙ : Excellent (fine and uniform dispersion)
○: Good
Δ: Insufficient
×: Poor.

Rating standard for form of polyamide

⊙ : Excellent (almost all portions of polyamide have a fine short fiber form having a length of 0.05 mm or more and a maximum diameter of 0.005 mm or less in the cross-section orthogonal to the longer direction)
○: Good (most portions of polyamide has a fine short fiber form mentioned above.)
Δ: Insufficient (there are too many portions of polyamide having a maximum sectional diameter of more than 0.005 mm)
×: Poor (major portions of polyamide are in a lump state).

COMPARATIVE EXAMPLE 1

There was repeated the same procedure as in Exam-

TABLE 1

| Material used | Trade name | (Manufacturer) | Properties, etc. |
| --- | --- | --- | --- |
| Chlorinated polyethylene | Daisolac H135 | (Daiso K.K.) | Noncrystalline |
|  | Daisolac G235 | (Daiso K.K.) | Semicrystalline |
|  | Daisolac U303 | (Daiso K.K.) | Semicrystalline |
| Polyamide | Ube Nylon 1030 B | (Ube Kosan K.K.) | Nylon 6 |
|  | Ube Nylon 2026 B | (Ube Kosan K.K.) | Nylon 66 |
| Reactive binder | KBM 603 | (Shin-Etsu Kagaku Kogyo K.K.) | Aminosilane compound |
|  | KBC 1003 | (Shin-Etsu Kagaku Kogyo K.K.) | Vinylsilane compound |
|  | 550 PL | (Meiwa Kasei K.K.) | Novolac type phenolic resin |

EXAMPLE 1

Materials of the kinds and proportions shown in Table 2 were fed into a Brabender Plastograph set at 230° C. and 50 rpm, and kneaded for 5 minutes. The kneaded product was fed into a 20-mm screw extruder provided with a nozzle having a hole of 2 mm in diameter and 4 mm in length, and extruded into a string from at 230° C. The extrudate was taken off at a stretch ratio of 1.6 to obtain a fiber-reinforced chlorinated polyethylene composition.

For the fiber-reinforced chlorinated polyethylene composition, the dispersibility of polyamide was evaluated according to the following four-level rating stanple 1 except that (1) the Brabender Plastograph was set at 150° C. and 50 rpm, (2) the temperature of the 20-mm screw extruder was set at 150° C., and (3) the stretch ratio was set at 1.5. The results are shown in Table 2.

EXAMPLES 2–4

There was repeated the same procedure as in Example 1 except that (1) at the time of kneading, there were further added 550 PL and hexamethylenetetramine (Example 2), resorcin and hexamethylenetetramine (Example 3) and KBC 1003 (Example 4), and (2) the stretch ratio was set at 3.5 (Example 2), 2.0 (Example 3) and 1.2 (Example 4). The results are shown in Table 2.

TABLE 2

|  | Example 1 | Comparative Example 1 | Example 2 | Example 3 | Example 4 |
| --- | --- | --- | --- | --- | --- |
| Compounding recipe (parts) |  |  |  |  |  |
| Daisolac H 135 | 100 | 100 | 100 | 100 | 100 |
| Stabilizer | 1.3 | 1.3 | 1.3 | 1.3 | 1.3 |
| Calcium stearate | 0.2 | 0.2 | 0.2 | 0.2 | 0.2 |
| Acid acceptor | 2 | 2 | 2 | 2 | 2 |
| Antioxidant | 2.5 | 2.5 | 2.5 | 2.5 | 2.5 |
| Ube Nylon 1030B | 50 | 50 | 50 | 50 | 50 |
| 550 PL | — | — | 2 | — | — |
| Resorcin | — | — | — | 2 | — |
| Hexamethylene tetramine | — | — | 0.2 | 0.2 | — |
| KBC 1003 | — | — | — | — | 0.5 |
| Conditions |  |  |  |  |  |
| Kneading temperature (°C.) | 230 | 150 | 230 | 230 | 230 |
| Stretch ratio | 1.6 | 1.5 | 3.5 | 2.0 | 1.2 |

TABLE 2-continued

| | Example 1 | Comparative Example 1 | Example 2 | Example 3 | Example 4 |
|---|---|---|---|---|---|
| Evaluation | | | | | |
| Dispersibility of polyamide | ○ | X | ⊚ | ⊚ | ⊚ |
| Form of polyamide | ○ | X (lump form) | ⊚ | ⊚ | ⊚ |

EXAMPLE 5

Materials of the kinds and proportions shown in Table 3 were fed into a 30-mm screw extruder provided with a nozzle having a hole of 2 mm in diameter and 4 mm in length, and kneaded for about 5 minutes at 230° C. and extruded into a string form. The extrudate was taken off at a stretch ratio of 2.2 to obtain a fiber-reinforced chlorinated polyethylene composition.

The fiber-reinforced chlorinated polyethylene composition was evaluated in the same manner as in Example 1. The results are shown in Table 3.

EXAMPLE 6 AND COMPARATIVE EXAMPLE 2

There was repeated the same procedure as in Example 5 except that in both Example 6 and Comparative Example 2, the amounts of Ube Nylon 1030 B and KBM 603 were increased and kneading temperature and the stretch ratio were set at 235° C. and 1.6, respectively. The results are shown in Table 3.

EXAMPLE 7 AND COMPARATIVE EXAMPLE 3

There was repeated the same procedure as in Example 5 except that the amount of KBM 603 was increased in both Example 7 and Comparative Example 3 and the stretch ratio was set at 1.9 (Example 7) and 1.3 (Comparative Example 3). The results are shown in Table 3.

at 4.6 (Example 9) and 9.0 (Example 10). The results are shown in Table 4.

TABLE 4

| | Example 8 | Example 9 | Example 10 |
|---|---|---|---|
| Compounding recipe (parts) | | | |
| Daisolac H 135 | 100 | — | — |
| Daisolac G 235 | — | 100 | — |
| Daisolac U 303 | — | — | 100 |
| Stabilizer | 5 | 1.3 | 1.3 |
| Calcium stearate | 0.8 | 0.2 | 0.2 |
| Acid acceptor | 2 | 2 | 2 |
| Antioxidant | 2.5 | 2.5 | 2.5 |
| Ube Nylon 1030 B | — | 70 | 70 |
| Ube Nylon 2026 B | 50 | — | — |
| KBM 603 | 0.4 | 0.6 | 0.6 |
| Conditions | | | |
| Kneading temperature (°C.) | 265 | 230 | 230 |
| Stretch ratio | 1.6 | 4.6 | 9.0 |
| Evaluation | | | |
| Dispersibility of polyamide | ⊚ | ⊚ | ⊚ |
| Form of polyamide | ⊚ | ⊚ | ⊚ |

COMPARATIVE EXAMPLE 4

A chlorinated polyethylene, various compounding agents and a vulcanizing agent were compounded according to the recipe shown in Table 5, using a 6-inch roll of 80° C. The resulting compound was placed in a

TABLE 3

| | Example 5 | Example 6 | Comparative Example 2 | Example 7 | Comparative Example 3 |
|---|---|---|---|---|---|
| Compounding recipe (parts) | | | | | |
| Daisolac H135 | 100 | 100 | 100 | 100 | 100 |
| Stabilizer | 1.3 | 1.3 | 1.3 | 1.3 | 1.3 |
| Calcium stearate | 0.2 | 0.2 | 0.2 | 0.2 | 0.2 |
| Acid acceptor | 2 | 2 | 2 | 2 | 2 |
| Antioxidant | 2.5 | 2.5 | 2.5 | 2.5 | 2.5 |
| Ube Nylon 1030 B | 50 | 88 | 150 | 50 | 50 |
| KBM 603 | 0.4 | 0.6 | 1.1 | 5 | 10 |
| Conditions | | | | | |
| Kneading temperature (°C.) | 230 | 235 | 235 | 230 | 230 |
| Stretch ratio | 2.2 | 1.6 | 1.6 | 1.9 | 1.3 |
| Evaluation | | | | | |
| Dispersibility of polyamide | ⊚ | ⊚ | Δ | ⊚ | X |
| Form of polyamide | ⊚ | ⊚ | Δ | ⊚ | X (lump form) |

EXAMPLE 8

There was repeated the same procedure as in Example 1 except that (1) materials of the kinds and proportions shown in Table 4 were used, (2) the conditions of the Brabender Plastograph were set at 265° C. and 50 rpm, (3) the temperature of the 20-mm screw extruder was set at 265° C., and (4) the stretch ratio was set at 1.6. The results are shown in Table 4.

EXAMPLES 9 AND 10

There was repeated the same procedure as in Example 5 except that materials of the kinds and proportions shown in Table 4 were used and the stretch ratio was set sheet mold and subjected to press vulcanization for 10 minutes at 170° C. to obtain a sheet-shaped primary vulcanizate of 2 mm in thickness. Then, JIS No. 1 dumbbell-shaped test pieces were prepared from the primary vulcanizate by punching. The test pieces were subjected to oven vulcanization for 30 minutes at 170° C. to obtain a secondary vulcanizate as ordinary state test pieces.

The ordinary state test pieces were subjected to a tensile test according to JIS K 6301 to measure 50% modulus, 100% modulus, strength and elongation at break. Further, the JIS No. 1 dumbbell-shaped test pieces prepared from the primary vulcanization were subjected to a strain of 100% elongation and then subjected to secondary vulcanization to obtain a secondary vulcanizate as pre-strained test pieces. Th resulting pre-strained test pieces were subjected to the same tensile test. The 50% modulus of this pre-strained test pieces were compared with that of the ordinary state test piece to measure the retention (%) of 50% modulus; thus, fatigue resistance was evaluated. Furthermore, processability was evaluated according to the following four-level rating standard, by examining the surface condition of the primary vulcanizate sheet by visual observation and touching. The results are shown in Table 5.

Rating standard for surface condition of primary vulcanizate sheet

◉ : Excellent (completely smooth)
○: Good (substantially smooth)
△: Insufficient (surface roughening is seen)
×: Poor (severe surface roughening is seen)

EXAMPLES 11–14

There was repeated the same procedure as in Comparative Example 4 except that the fiber-reinforced chlorinated polyethylene compositions of Examples 1, 2, 3 and 4 were further used as master batches ①, ②, ③ and ④, respectively, so that the proportion of polyamide became about 10 parts per 100 parts of chlorinated polyethylene in each Example, as shown in Table 5. The results are shown in Table 5.

TABLE 5

|  | Comparative Example 4 | Example 11 | Example 12 | Example 13 | Example 14 |
|---|---|---|---|---|---|
| Compounding recipe (parts) | | | | | |
| Daisolac H 135 | 100 | 80 | 80 | 80 | 80 |
| Master batch ① *1 | — | 31.1 | — | — | — |
| Master batch ② *2 | — | — | 31.3 | — | — |
| Master batch ③ *3 | — | — | — | 31.3 | — |
| Master batch ④ *4 | — | — | — | — | 31.3 |
| Carbon black | 70 | 70 | 70 | 70 | 70 |
| Process oil | 30 | 30 | 30 | 30 | 30 |
| Magnesium Oxide | 10 | 10 | 10 | 10 | 10 |
| Antioxidant | 1 | 1 | 1 | 1 | 1 |
| Vulcanizing agent | 5 | 5 | 5 | 5 | 5 |
| Properties of vulcanizate | | | | | |
| 50% modulus (MPa) | 2.9 | 6.1 | 6.1 | 6.4 | 7.5 |
| 100% modulus (MPa) | 6.1 | 9.1 | 9.6 | 11.3 | 11.1 |
| Strength at break (MPa) | 15.2 | 15.0 | 15.5 | 16.2 | 16.0 |
| Elongation at break (%) | 298 | 185 | 194 | 198 | 189 |
| Fatigue resistance (%) | 91 | 86 | 89 | 100 | 96 |
| Surface condition of sheet | ◉ | ◉ | ◉ | ◉ | ◉ |

*1 Fiber-reinforced chlorinated polyethylene composition of Example 1.
*2 Fiber-reinforced chlorinated polyethylene composition of Example 2.
*3 Fiber-reinforced chlorinated polyethylene composition of Example 3.
*4 Fiber-reinforced chlorinated polyethylene composition of Example 4.

EXAMPLES 15–17, COMPARATIVE EXAMPLE 5, EXAMPLE 18

There was repeated the same procedure as in Comparative Example 4 except that the fiber-reinforced chlorinated polyethylene compositions of Examples 5, 6 and 7 and Comparative Example 2 were further used as master batches ⑤, ⑥, ⑫ and ⑦, respectively, as shown in Table 6 and compounding was made using a 10-inch roll of 80° C. The results are shown Table 6.

TABLE 6

|  | Example 15 | Example 16 | Example 17 | Comparative Example 5 | Example 18 |
|---|---|---|---|---|---|
| Compounding recipe (parts) | | | | | |
| Daisolac H 135 | 90 | 80 | 88.6 | 93.3 | 80 |
| Master batch ⑤ *5 | 15.6 | 31.2 | — | — | — |
| Master batch ⑥ *6 | — | — | 22.1 | — | — |
| Master batch ⑫ *7 | — | — | — | 17.1 | — |
| Master batch ⑦ *8 | — | — | — | — | 32.2 |
| Carbon black | 70 | 70 | 70 | 70 | 70 |
| Process oil | 30 | 30 | 30 | 30 | 30 |
| Magnesium Oxide | 10 | 10 | 10 | 10 | 10 |
| Antioxidant | 1 | 1 | 1 | 1 | 1 |
| Vulcanizing agent | 5 | 5 | 5 | 5 | 5 |
| Properties of vulcanizate | | | | | |
| 50% modulus (MPa) | 4.8 | 6.2 | 6.4 | 8.0 | 7.5 |
| 100% modulus (MPa) | 8.5 | 10.7 | 11.0 | — | 11.9 |
| Strength at break (MPa) | 16.0 | 17.3 | 16.8 | 10.5 | 15.8 |
| Elongation at break (%) | 258 | 205 | 197 | 72 | 163 |
| Fatigue resistance (%) | 97 | 96 | 96 | 67 | 85 |
| Surface condition of sheet | ◉ | ◉ | ◉ | △ | ○ |

*5 Fiber-reinforced chlorinated polyethylene composition of Example 5
*6 Fiber-reinforced chlorinated polyethylene composition of Example 6
*7 Fiber-reinforced chlorinated polyethylene composition of Comparative Example 2
*8 Fiber-reinforced chlorinated polyethylene composition of Example 7

EXAMPLES 19-21

There was repeated the same procedure as in Comparative Example 4 except that the fiber-reinforced chlorinated polyethylene composition of Examples 8, 9 and 10 were further used as master batches ⑧, ⑨, and ⑩, respectively, as shown in Table 7 and compounding was made using a 6-inch roll of 80° C. The results are shown in Table 7.

COMPARATIVE EXAMPLE 6

There was repeated the same procedure as in Comparative Example 4 except that a cut fiber of polyamide was further used as shown in Table 7 and compounding was made using a 6-inch roll of 80° C. The results are shown in Table 7.

What is claimed is:

1. A fiber-reinforced chlorinated polyethylene composition comprising 100 parts by weight of a chlorinated polyethylene and 2-100 parts by weight of polyamide fibers having a length of at least 0.05 mm and maximum diameter of the cross-section orthogonal to the longitudinal direction not more than 0.005 mm dispersed in said chlorinated polyethylene.

2. A fiber-reinforced chlorinated polyethylene composition according to claim 1, wherein said chlorinated polyethylene is non-crystalline, microcrystalline or semicrystalline.

3. A fiber-reinforced chlorinated polyethylene composition according to claim 1, wherein the polyamide is at least one member selected from the group consisting of nylon 6, nylon 11, nylon 12, nylon 66, nylon 610, nylon 612 and nylon 6,66.

TABLE 7

|  | Example 19 | Example 20 | Example 21 | Comparative Example 6 |
|---|---|---|---|---|
| Compounding recipe (parts) | | | | |
| Daisolac H 135 | 80 | 86 | 86 | 100 |
| Master batch ⑧ *9 | 32.1 | — | — | — |
| Master batch ⑨ *10 | — | 25.2 | — | — |
| Master batch ⑩ *11 | — | — | 25.2 | — |
| Cut fiber *12 | — | — | — | 10 |
| Carbon black | 70 | 70 | 70 | 70 |
| Process oil | 30 | 30 | 30 | 30 |
| Magnesium Oxide | 10 | 10 | 10 | 10 |
| Antioxidant | 1 | 1 | 1 | 1 |
| Vulcanizing agent | 5 | 5 | 5 | 5 |
| Properties of vulcanizate | | | | |
| 50% modulus (MPa) | 6.5 | 9.1 | 10.2 | 10.3 |
| 100% modulus (MPa) | 11.0 | 12.1 | 12.2 | — |
| Strength at break (MPa) | 17.0 | 18.9 | 18.6 | 12.5 |
| Elongation (%) | 197 | 170 | 150 | 74 |
| Fatigue resistance (%) | 96 | 92 | 90 | 55 |
| Surface condition of sheet | ⊚ | ⊚ | ○ | △ |

*9 Fiber-reinforced chlorinated polyethylene composition of Example 8
*10 Fiber-reinforced chlorinated polyethylene composition of Example 9
*11 Fiber-reinforced chlorinated polyethylene composition of Example 10
*12 Obtained by cutting a nylon fiber of about 0.02 mm in diameter to a length of about 2 mm.

* * * * *